340-566 SR

XR 3,930,246

United State[s]
Campbell

[11] 3,930,246
[45] Dec. 30, 1975

[54] ELECTRICAL ALARM SYSTEM

[75] Inventor: Scott V. Campbell, Melbourne, Fla.

[73] Assignee: Francis A. Scott, Daytona Beach, Fla.

[22] Filed: Jan. 13, 1975

[21] Appl. No.: 540,537

[52] U.S. Cl. .............. 340/214; 340/213.1; 340/416
[51] Int. Cl.[2] .............................. G08B 25/00
[58] Field of Search ............ 340/213 R, 213.1, 214, 340/226, 276, 313, 409, 416; 179/5 R; 325/152 UX

[56] References Cited

UNITED STATES PATENTS 3,473,055 10/1969 Olson ........................ 325/152 UX

*Primary Examiner*—Alvin H. Waring

[57] ABSTRACT

An electrical alarm system for monitoring from a central monitoring station various conditions including sounds at one or more remote protected stations is disclosed. The system utilizes conventional signal communications media, including but not limited to telephone lines, T.V. cables, and microwave for the transfer of signals between the monitoring station and the remote stations. The central station includes means for periodically producing and transmitting an audio frequency line integrity test signal to the remote station. The remote station includes means to receive the periodic audio frequency test signals and in response thereto has means to produce one or more different frequency response signals indicative of specific conditions at the remote station. The response signals are returned to the central station, provided the interconnecting circuits are complete, where they are detected by one or more tone detectors. The detected response signals at the central station stop the transmission of test signals until another test cycle is initiated. The presence of the response signals at the central station verifies the line integrity of the system between the central and remote stations. The absence of a response signal at the central station after a predetermined time interval indicates line failure and an alarm is actuated. The "on" — "off" status of the monitor at the remote station is tested and differentiated from the line integrity test by means at the remote station for producing a different frequency response signal when the monitor is "off" from that produced when the monitor is "on." The response signals indicative of the "on" or "off" status of the remote station are detected by separate detectors at the central station and, depending upon which signal is received, control a status register and indicator. A special circuit at the remote station will block the transmission of any response signals to the central station when microphone leads in a sound monitor are cut. The absence of response signals at the central station alerts an operator at the central station to a failure in the system. A fire sensor and one or more sensors of emergency conditions at the remote station cause the generation of different audio frequency signals indicative of specific abnormal conditions which are sensed. These frequencies are transmitted to and detected at the central station to cause alarms indicative of the specific abnormal conditions occurring at the remote station to be actuated.

13 Claims, 9 Drawing Figures

ELECTRICAL ALARM SYSTEM

BACKGROUND OF THE INVENTION

1. Field of the Invention

This invention relates to an improved electrical alarm system for monitoring at a central station various conditions present at one or more remote stations making use of modern communication systems for the exchange of signals between the remote and central stations.

2. Description of the Prior Art

Alarm systems for monitoring at a central station various security conditions, such as fire, burglary, system integrity, etc. at one or more remote stations are known in the prior art. Many of the prior systems have required the use of direct line metallic conductor circuits between the remote and central stations and could not be used with telephone circuits that interposed transformers, amplifiers repeaters, microwave relays, or carrier equipment. The system described herein has none of the aforesaid restrictions and includes a number of new and improved operational features as well.

Patents representative of the prior art are: 3,069,673, 3,553,687, 3,307,176, 3,613,093, 3,426,348, 3,078,509, 3,475,751, 3,705,401, 3,487,397, 3,707,708, 3,526,729, 3,790,723.

SUMMARY OF THE INVENTION

This invention relates to new and useful improvements in electrical alarm systems of the general type in which one or more protected stations are connected by telephone systems to a central monitoring station so that abnormal conditions, such as fires, burglaries, holdups, and the like as well as status and integrity conditions of the equipment at the protected stations may be monitored at the central station.

It is an object of this invention to provide an alarm system in which electrical signals of an audio frequency may be exchanged between a central monitoring station and plural remote protected stations using signal carriers such as telephone lines which need not include direct metalic conductors interconnecting the central station and the remote stations. Thus it is possible with the present system to utilize telephone systems which include transformers, amplifiers, microwave relays, and the like which would block the flow of direct current between a central and remote station.

It is another object of this invention to provide an improved alarm system for detecting various abnormal conditions including sounds at a protected station, producing different electrical signals indicative of the conditions, transmitting the signals to a central monitoring station where the various signals are isolated by separate detectors, and actuating appropriate alarms indicative of the abnormal condition detected.

It is a further object of this invention to provide an improved system for testing the line integrity of the system interconnecting the central and remote station or stations as the case may be.

It is a further object of this invention to provide means for detecting when leads from a microphone sound pickup at the protected station are cut, and additional means for checking the "on" — "off" status of the monitoring equipment at the remote station from the central station.

BRIEF DESCRIPTION OF THE DRAWINGS

With the foregoing objects and features in view and such other objects and features which may become apparent as this specification proceeds, the invention will be understood from the following description taken in conjuction with the accompanying drawings, wherein like characters of reference designate like parts and wherein.

DETAILED DESCRIPTION OF THE INVENTION

Figure 1:
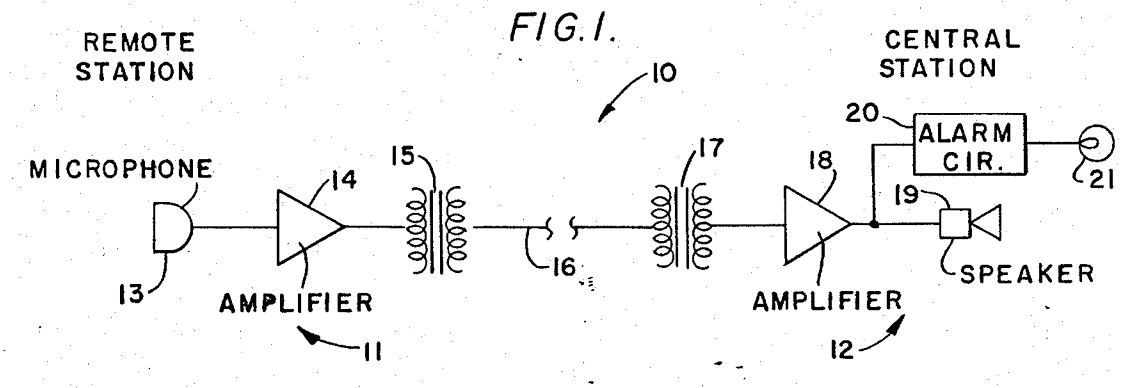
FIG. 1 is a simplified partially block, partially schematic diagram of a basic alarm system for monitoring a remote station from a central station to which this invention applies.

In FIG. 1 a basic monitoring system 10 to which this invention applies is shown. Sounds are detected at a remote protected station 11 by means of a microphone 13 which converts the sounds picked up at the protected station to audio frequency electrical signals. The audio frequency signals from microphone 13 are amplified by amplifier 14, coupled to telephone line 16 by means of transformer 15 and transmitted via the telephone line 16 to a central monitoring station 12. At the central station 12 the electrical signals are coupled from the telephone line 16 by means of the transformer 17, amplified by amplifier 18 and introduced into loud speaker 19 which converts the electrical signals to a sound output which is monitored by an operator. Alarm circuitry 20, containing a threshold detector and other elements (not shown) operates to visually alert the attending personnel to an alarm condition at the remote station by energizing a light 21. Audible alarms may be used along with, or in lieu of the light 21 to alert the attending personnel to an abnormal condition at the remote station 11.

FIGS. 2–7 are illustrative of special circuits which are incorporated in the basic alarm system 10 illustrated in FIG. 1 in accordance with this invention. For purpose of clarity the special circuits are illustrated separately but it will be understood that they will usually be incorporated into more complex alarm systems.

Figure 2:
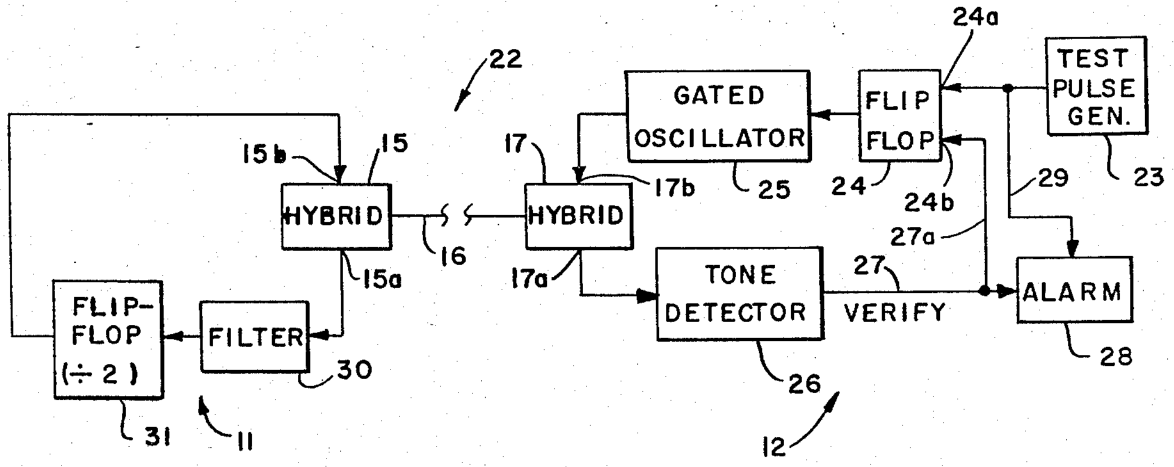
FIG. 2 is a block diagram of a line integrity test system in accordance with this invention for testing the line integrity of the basic alarm system shown in FIG. 1.

The circuit shown in FIG. 2 is a tone-burst signalling system 22 which is provided to monitor the line integrity of the alarm system 10 between the remote and central stations 11 and 12 respectively. The line integrity monitor circuit includes at the central station 12 a test pulse generator 23 which periodically supplies a test pulse to one input terminal 24*a* of a test flip-flop 24. This sets the flip-flop 24 to gate on a gated oscillator 25, which by way of example only, is a 3 KHZ frequency oscillator. The 3 KHZ tone from the oscillator 25 is coupled into the telephone line 16 through a hybrid transformer 17 (sometimes called a four-wire terminating set) which has receive and transmit ports 17*a* and 17*b* respectively. Also at the central station 12 are a tone detector 26 and an alarm 28 which will be subsequently described. The line integrity monitor 22 includes at the remote station 11 a hybrid transformer 15, identical with the transformer 17 at the central station, a 3 KHZ band-pass filter 30, a divide by two flip-flop divider 31 and connecting circuitry. The hybrid transformer 15 routes the incoming 3 KHZ tone from its receive port 15*a* through the 3 KHZ band-pass filter 30 into the divider 31 which divides the frequency of the tone by two. The resulting 1500 HZ tone enters the transmit port 15*b* of the hybrid transformer and is transmitted to the central station 12 via the telephone line 16. At the central station 12 the 1500 HZ tone enters the hybrid transformer 17 and through its receive port 17*a* is directed to the tone detector 26 which is tuned to 1500 HZ. The tone detector 26 is preferably a conventional phase-lock loop, however, other circuits for detecting the 1500 HZ tone can be used. The tone detector 26 produces an output signal when it receives a 1500 HZ tone from the remote station, which is applied via conductor 27*a* to the reset terminal 24*b* of the flip-flop 24 to clear the test flip-flop. The change in state of the test flip-flop 24 turns off the gated oscillator 25. The circuit 27*a* attached to the test flip-flop 24 from the tone detector 26 in effect times the length of the tone burst generated by the oscillator 25. As can be seen, the length of the tone burst is determined by the propation delays in the telephone line 16 and by the response time of the electronic circuits in the integrity monitor system. If the path for transmitting the 3 KHZ tone burst signal from the central station to the remote station and for returning the 1500 HZ signal from the remote station to the central station is broken, the 1500 HZ return tone will not reach the tone detector 26 and the gated oscillator 25 will remain on. The fact that the oscillator has remained on beyond the normal propagation delay of the system actuates the alarm 28 which may be audible, visual or both.

The alarm 28 is supplied with a test pulse signal from the test pulse generator 23 over the line 29 at the same time that the test pulse signal is applied to the test flip-flop 24. Within the alarm 28 is a time delay circuit which delays the test pulse from triggering the alarm 28 for the normal propagation delay period for the integrity monitor system. The alarm 28 has a second input from the tone detector 26 over the line 27. An output signal from the tone detector 26 upon its receipt of the return 1500 HZ signal within the normal propagation delay period will prevent the actuation of the alarm 28 by the test pulse on line 29. However, if the tone detector 26 does not receive the 1500 HZ signal within the normal propagation delay period it will produce no output signal, and the alarm 28 will be actuated at the end of the normal propagation delay period. Operating personnel at the central station will then be alerted that the integrity of the alarm system in which the integrity monitor 22 is incorporated has been disturbed, and corrective action can be taken. A particular advantage of the integrity monitor 22 is that the length of the tone burst is minimized and therefore the possibility of interference caused by the tone burst with other signals applied over the alarm system is reduced.

Figure 3:
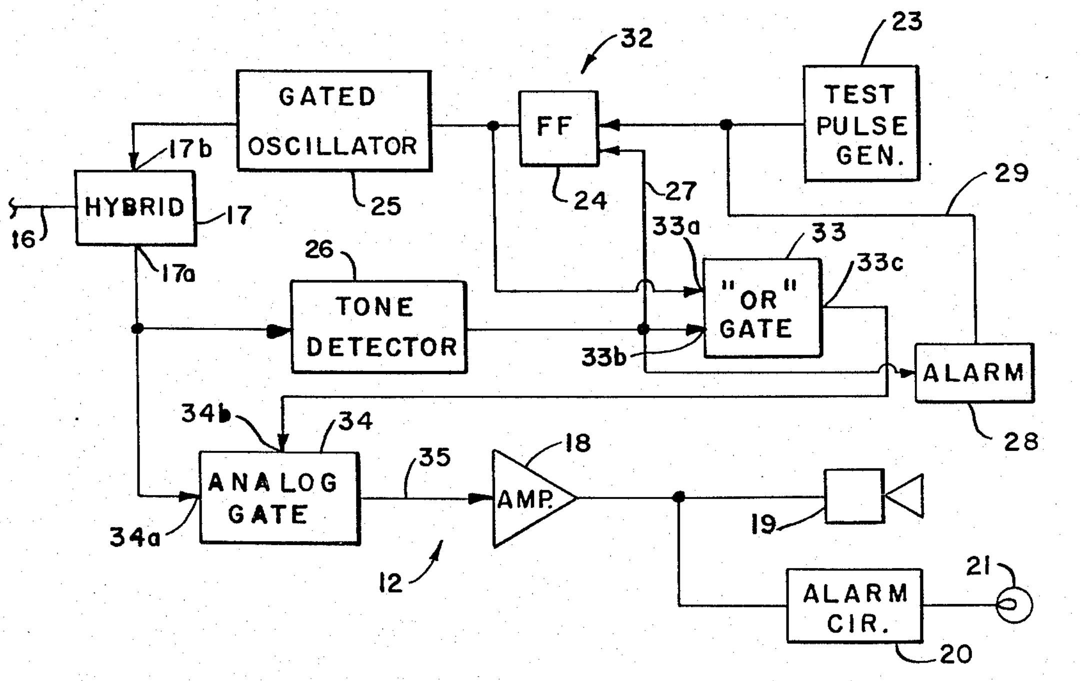
FIG. 3 is a block diagram of the central station components of the basic alarm system shown in FIG. 1 combined with a slightly modified version of the line integrity test system shown in FIG. 2.
Figure 4:
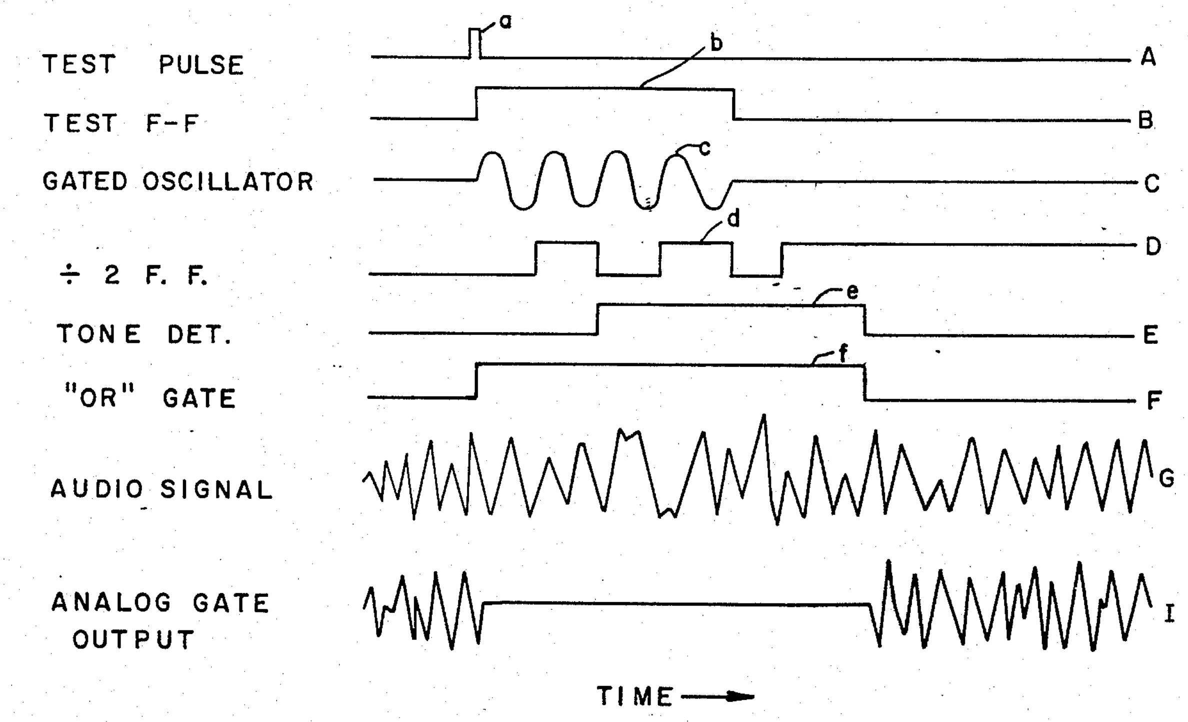
FIG. 4 is a diagram showing voltage versus time wave forms produced at specific locations in the circuit illustrated in FIG. 3.

If the integrity monitor 22 is combined with the basic alarm system 10 shown in FIG. 1 so that signals picked up by microphone 13 and the tone burst signals of the integrity monitor are transmitted simultaneously over the telephone line 16, a short duration sound like a "tick" would be heard over the loud speaker 19 unless means are provided to prevent passage of the test tone bursts over the audio portion of the alarm system. FIG. 3 illustrates a system combining a line integrity monitor with the basic alarm system of FIG. 1 so that the signals from the integrity monitor are removed from the audio output of the basic alarm system. While only the central station portion of the combined system is shown in FIG. 3, it will be understood that a remote protected station will have all of the components shown on the left hand side of both FIGS. 1 and 2. The audio channel of FIG. 1 including microphone 13 and amplifier 14, would be connected into the hybrid transformer 15 of FIG. 2 so as to couple audio frequency signals into the telephone line 16 for transmission to the central station 12. The central station side of the combined system 32 includes the test pulse generator 23, the test flip-flop 24, the gated oscillator 25, the hybrid transformer 17, the tone detector 26, and alarm 28 of the line integrity monitor shown in FIG. 2. It also includes the amplifier 18, the loud speaker 19, the alarm circuit 20 and indicator light 21 of the alarm system 10 shown in FIG. 1. In addition the combined system includes an OR gate 33 and an analog gate 34 for blocking both the 3000 HZ and 1500 HZ signals from the audio output channel 35. The analog gate 34 is connected in parallel with the tone detector 26 to receive signals from the receive port 17 *a* of the hybrid amplifier 17. It is connected in series circuit with the audio amplifier 18 and the loud speaker 19 which together with the alarm circuit 20 and indicator 21, connected to the output side of amplifier 18, make up the audio channel 35. The OR gate 33 has two input terminals 33*a* and 33*b* which are connected to the output sides of the test flip-flop 24 and tone detector 26 respectively. The output terminal 33*c* of the OR gate 33 is connected to the control terminal 34*b* of the analog gate 34. When an input signal is present an either of the input terminals 33*a* and 33*b* of the OR gate, an output signal is produced by the OR gate which is applied to the analog gate control terminal 34*b* to cause the analog gate to turn off and prevent signals appearing at the analog gate input terminal 34*a* from passing into the audio channel 35. Typical wave forms for the system illustrated in FIG. 3 are shown in FIG. 4. Line A of FIG. 4 shows a test pulse *a* which is applied periodically to the flip-flop 24. Line B shows the output pulse *b* which is produced by the flip-flop 24 when turned on by the test pulse a. Line C shows the 3000 HZ sign wave output c of the gated oscillator 25. Line D shows the 1500 HZ output from the divide-by-two flip-flop 31 (see FIG. 2) at the remote station 11 which is fed back to the central station 12 provided the telephone transmission line 16 is complete. Line E shows the output wave form of the tone detector 26, which is applied to the test flip-flop 24, to the alarm 28 and to the OR gate 33. Line F shows the output pulse of the OR gate 33 which is applied to the control input terminal of the analog gate 34 to close the analog gate during the time that the 3 KHZ tone burst is being generated by the oscillator 25 and the 1500 HZ return signal from the remote station is being detected by the tone detector 26. Line G is illustrative of the audio signal applied to the input terminal 34*a* of the analog gate 34, while line I shows the analog gate output applied to the audio channel 35. By comparing lines F and I it can be seen that audio signals are blocked from the audio channel 35 during the time that the OR gate produces the output pulse F. Since the total gating period is only a few milliseconds, the entire testing process is almost completely inaudible. By way of specific example, if the central station 12 is monitoring 100 remote stations 11 through a multiplexing system, the test pulse generator 23 supplies a test pulse to each remote station every 100 seconds so that a different remote station channel is tested for line integrity every second.

Figure 5:
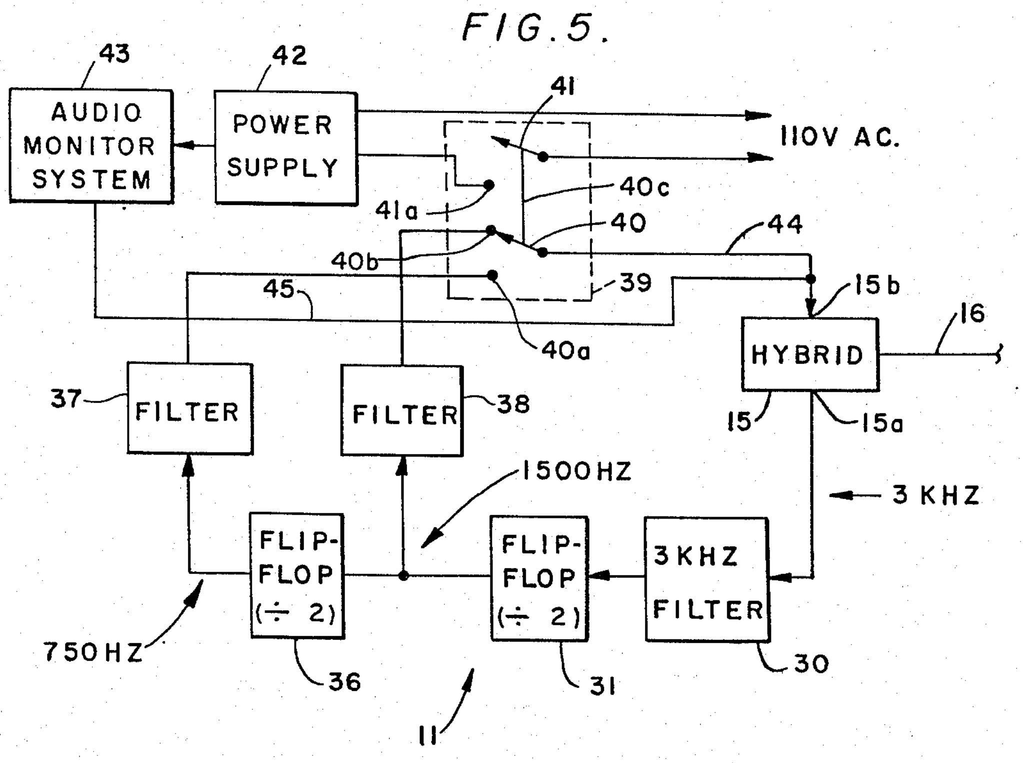
FIG. 5 is a block diagram showing system components at a remote station for testing the "on-off" status of a remote station monitor system.
Figures 6, 7:
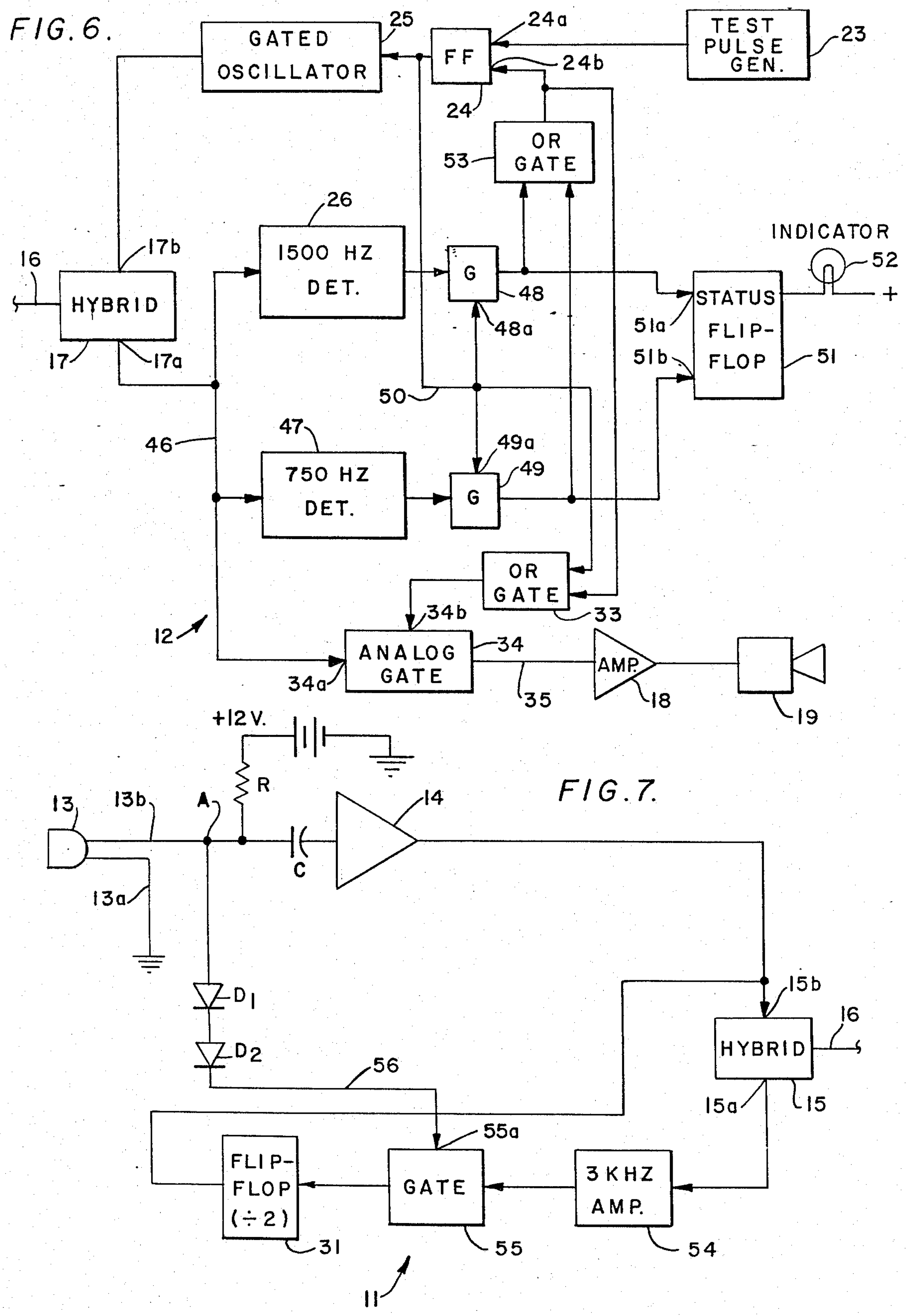
FIG. 6 is a block diagram showing system components at a central station for use in determining the status of the monitor system at the remote station shown in FIG. 5.
FIG. 7 is a partial schematic, partial block diagram of circuit components at a remote station for testing the line integrity of microphone leads in an audio monitor system.

FIGS. 5 and 6 respectively show circuits provided at a remote station 11 and at a central station 12 for alerting the operating personnel at the central station of the on or off status of the audio monitoring portion of the alarm system at the remote station. FIGS. 5 and 6 are simplified block diagrams showing particularly those portions of an alarm system involved in monitoring the on or off status of the remote station. According to the status monitoring system disclosed in FIGS. 5 and 6 the on-off status of the remote station 11 will be tested periodically in response to test pulse signals from a test pulse generator 23 at the central station 12. The central station (see FIG. 6) includes the same test pulse generator 23, test flip-flop 24, gated oscillator 25, and hybrid transformer for periodically transmitting 3 KHZ tone bursts over the telephone wire 16 to the remote station 11 as has been described with reference to FIGS. 2 and 3. The remote section 11(see FIG. 5) receives the 3 KHZ signals through the receive port 15*a* of the hybrid transformer 15 and divides the 3 KHZ frequency by two to produce a 1500 HZ signal and then divides the 1500 HZ signal by two to produce a 750 HZ signal. For this purpose a narrow band 3 KHZ filter 30 and a first divide-by-two flip-flop 31 are connected in series circuit with the receive port 15a of the hybrid transformer 15 and a second divide-by-two flip-flop 36 and 750 HZ filter 37 are connected in series circuit from the output side of the first divide-by-two flip-flop 31 to one contact 40*a* of the on-off status switch 40. The 1500 HZ output from the first divide-by-two flip-flop 31 is passed in circuit through a narrow band 1500 HZ filter 38 to a second contact 40*b* of the on-off status switch 40. The status switch 40 is operatively connected by a mechanical link 40*c* to the power circuit on-off switch 41 located in one line of a two wire power cord connected between a 110v AC power source and the power supply 42 for an audio monitor system 43. Thus when the power on-off switch 41 is in the off position indicated in FIG. 5, the movable pole of the status switch 40 will engage the 1500 HZ contact 40*b*. When the power switch 41 is closed, the movable pole of the status switch 40 will engage the 750 HZ contact 40*a*. A conductor 44 from the movable pole of the status switch to the transmit port 15*b* of the hybrid transformer 15 will carry either a 750 HZ or a 1500 HZ signal, depending upon the position of the status switch, to the hybrid transformer 15. The 750 HZ or 1500 HZ signal will thus be coupled back through line 16 to the central station 12 which is provided with means to detect the status signals and to display an indication of the on or off condition of the audio monitor system 43. It will be understood that the audio monitor system 43 includes means, such as the microphone 13 and amplifier 14 shown in FIG. 1, to pickup sound within the premises of the remote station and convert the sound into electrical signals which are transmitted via conductor 45, the hybrid transformer 15 and telephone line 16 to the central station 12 (FIG. 6). The on-off status condition testing and indicator system illustrated in FIGS. 5 and 6 viewed together may be used to test the on-off status of any electrical system or device at a remote station from a monitoring station and is not limited to use with the audio monitoring system illustrated in FIG. 5.

Returning now to FIG. 6, the status signal, either 750 HZ or 1500 HZ depending on the position of the status switch 40 at the remote station, and any other signals transmitted from the remote station such as audio signals from the audio monitor system 43 are coupled by the hybrid 17 from the telephone line 16 into the conductor 46. A 1500 HZ tone detector 26 and a 750 HZ tone detector 47 are connected in parallel to the conductor 46 to detect the 1500 HZ and 750 HZ status signals in separate channels. The output of the detectors 26 and 47 are connected to the signal input terminals of gates 48 and 49 respectively. These gates are controlled by signals fed over line 50 from the test flip-flop 24 to the gate control terminals 48*a* and 49*a* of the respective gates 48 and 49. The gates are opened only while the flip-flop 24 is gating the oscillator 25 on, and are closed at other times. A status flip-flop 51 has separate input terminals 51*a* and 51*b* connected respectively to the outputs of the gates 48 and 49. A signal appearing at the input terminal 51*a* will cause the flip-flop 51*a* to switch to one state while a signal at terminal 51*b* will cause the flip-flop to switch to a second state. Those signals detected by either of the detectors 26 and 47 will cause the status flip-flop 51 to assume one or the other of its two states. Since the 750 HZ signal has been illustrated in FIG. 5 as representing the on status of the audio monitoring system 43, the 750 HZ signal detected by detector 47 will cause the status flip-flop to register an on condition. On the other hand the 1500 HZ signal has been described in the discussion of FIG. 5 as representing the off condition of the audio monitor system 43, therefore, when the 1500 HZ detector 26 detects a 1500 HZ signal and the gate 48 is open, the flip-flop 51 will register an off condition. An indicator light 52 is connected to the output side of the status flip-flop 51 in such a manner as to be energized whenever the status flip-flop 51 registers the on status of the apparatus at the remote station. An OR gate 53 is provided for clearing the test flip-flop 24 and turning off the 3 KHZ test tone from the oscillator 25 if a tone is detected by either of the detectors 25 or 47. The OR gate 53 has separate input terminals connected to the output sides of the gates 48 and 49 respectively and an output terminal connected to the reset terminal 24*b* of the flip-flop 24. At the bottom of FIG. 6 an audio channel 35 is shown for amplifying and broadcasting audio signals from the remote station 11. This channel includes an amplifier 18 and loudspeaker 19 which are fed audiofrequency signals through the analog gate 34 from the conductor 46. The analog gate 34 is closed to prevent passage of audio frequency signals to the audio channel 35 whenever either of the detectors 26 or 47 detect a tone and when the test flip-flop 24 produces a signal turning on the oscillator 25. For this purpose the OR gate 33 is provided which has one input connected to the output of the OR gate 53 and a second input connected to the output of the flip-flop 24 via line 50. The output of the OR gate 33 is connected to the control terminal of the analog gate 34.

While the systems so far described have involved transmission of signals between a central station and a single remote station, it will be understood that the systems may include multiplexing means so that the central station can be connected to many remote stations. In the case of the on-off status monitor illustrated in FIGS. 5 and 6, the two tone detectors 26 and 47 can be connected by multiplexing means to monitor the status of up to 100 channels. One status flip-flop 51 and one indicator 52 would be provided for each channel and included in a digital register which stores the status of each channel.

Fire and emergency alarms may be provided at each remote site. These alarms would be signaled with 1500 HZ and 750 HZ tones that are generated at the remote site. Test logic would be provided at the central station which is able to differentiate between the test tones and the alarm tones since the test tones can only come at precisely controlled intervals and remain for only a few milli-seconds, while the alarm tones are not synchronized and last much longer.

Looking now at FIG. 7, if an intruder cuts the wires 13*a*, 13*b* between the microphone 13 and the remote amplifier 14 at the remote station 12, the audio portion of the system would be disabled. Since this must happen prior to an actual break-in, the integrity of these lines 13*a* and 13*b* should be monitored at all times, even if the audio portion of the system is turned off. This is accomplished by the circuit illustrated in FIG. 7. FIG. 7 shows a remote station 11 in which the audio pickup channel illustrated at the left in FIG. 1 and the line integrity test loop illustrated at the left in FIG. 2 are combined in one system. The audio pickup channel includes the microphone 13 and amplifier 14 connected in series circuit with the transmit port 15*b* of the hybrid transformer 15 for the purpose described with respect to FIG. 1. The line integrity test loop includes a 3KHZ amplifier 54 which amplifies and passes the 3 KHZ test signal from the central station 12 (illustrated in FIG. 2), a gate 55, and a divide-by-two flip-flop 31 connected in series circuit between the receive port 15*a* and the transmit port 15*b* of the hybrid transformer 15. The gate 55 is normally open to pass the 3 KHZ test pulse to the divide-by-two flip-flop 31 except when a control signal is present at the control terminal 55*a* of the gate to close the gate and block passage of the 3 KHZ signal. The control signal for closing the gate 55 is taken from point A on the input line 13*b* from the microphone 13 to the amplifier 14 and close to the amplifier via line 56 in which diodes D 1 and D 2 are connected in series. A resistor R connected between the plus side of a 12 volt dc power source and a point on the line 13*b* between the point A and the amplifier 14, normally provides a small current through the microphone to ground. Since the resistance of the microphone 13 is low compared to the resistance of R, the voltage at A remains nearly zero and no current flows through diodes D 1 and D 2. If the microphone leads are cut anywhere between the microphone and point A the voltage at A rises, current flows through D 1 and D 2 and the gate 55 is closed to prevent the 3 KHZ test signal from reaching the flip-flop 31. This breaks the line integrity check loop thus preventing a 1500 HZ signal from being returned to the central station 12 (shown in FIG. 2) and actuating the alarm 28 by the absence of the return 1500 HZ test tone as described with reference to FIG. 2.

Figure 8:
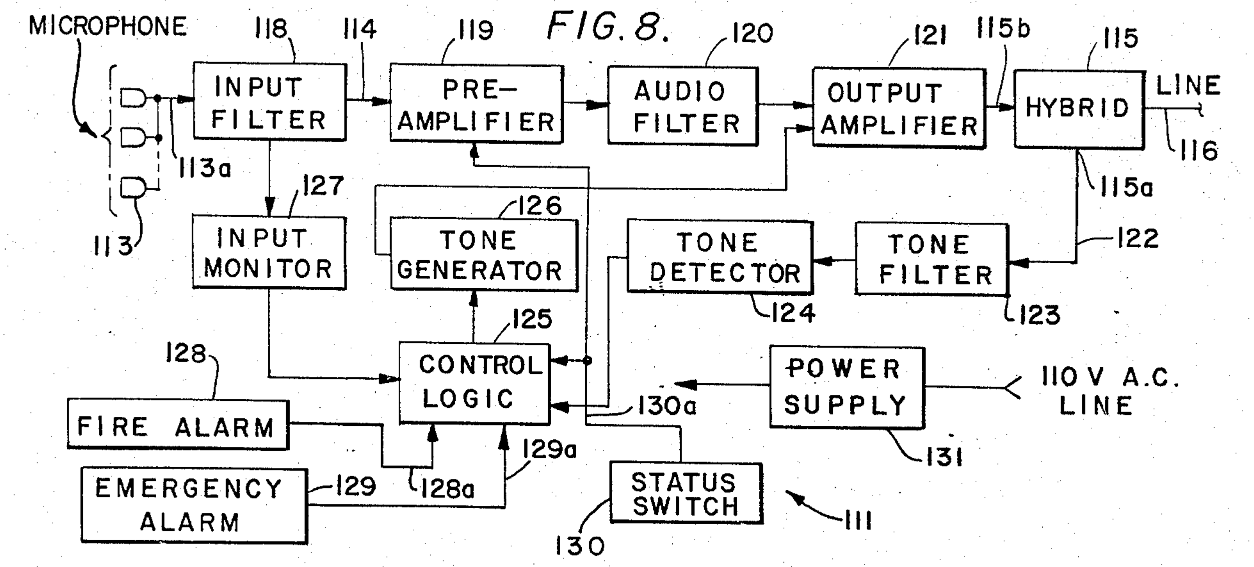
FIGS. 8 and 9 taken together are a block diagram of components at a remote and central station respectively of an alarm system in accordance with this invention.
Figure 9:
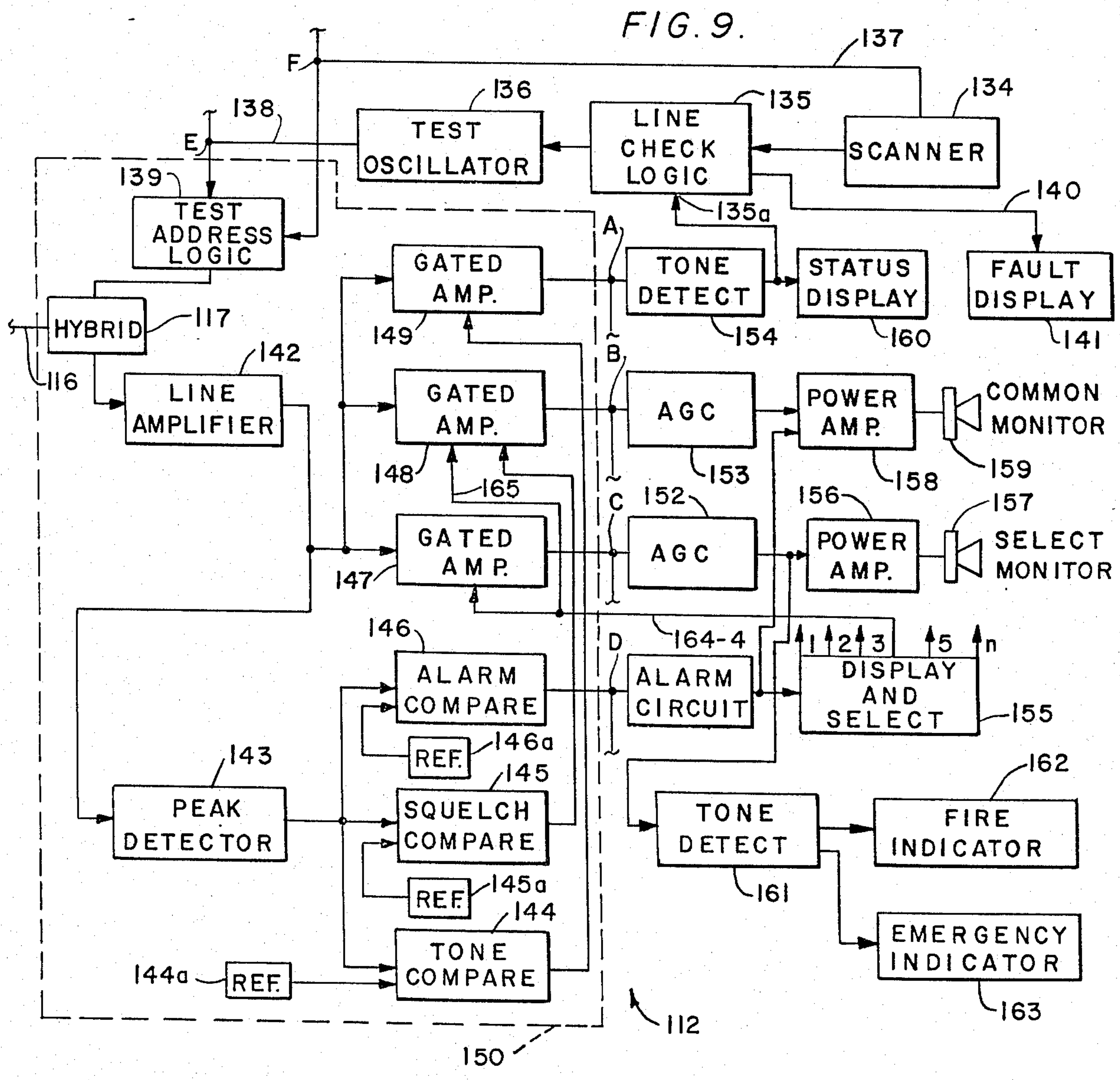

In FIGS. 8 and 9 taken together a composite alarm system is shown which performs essentially the same functions described heretofore with respect to FIGS. 1–7. FIG. 8 illustrates the portion of the system located at a remote protected station 111, while FIG. 9 illustrates the portion of the system located at a central monitoring station 112. The remote and central stations are connected by a telephone line 116. Multiple protected stations 111 with the system illustrated in FIG. 8 can be connected to the central station 112 and monitored thereby.

Each protected station 111 includes an audio channel 114 which prepares electrical audio signals from microphones 113 for transmission through the transmit port 115*b* of the hybrid circuit 115. The hybrid 115 is a conventional two transformer balance network which isolates signals transmitted and received over the telephone line 116. The audio channel 114 includes one or more microphones 113 located at selected places in the protected station for picking up sound at those places, an input filter 118, a preamplifier 119, an audio filter 120 and an output amplifier connected in series with the transmit port 115b of the hybrid 115. The preamplifier 119 is a low-noise, high-gain stage which has a provision for being turned on or off with a control signal from the status switch 130. This allows the audio channel 114 to be muted at the option of the customer. A manual gain control in the preamplifier compensates for conditions at each individual station. The output amplifier 121 and its associated audio filter circuit 120 provide voltage and power amplification to drive the telephone line 116. The audio filter 120 provides a sharp cut-off high-pass characteristic which significantly reduces low frequency interference such as air conditioner noise and power line hum. A test tone loop 122 is connected between the receive port 115a and the transmit port 115*b* of the hybrid 115. It includes a tone filter 123, a tone detector 124, control logic 125, tone generator 126 and the output amplifier 121.

The test tone filter 123 isolates the test tone transmitted from central station 112 that is used to check line continuity and prevents potentially interfering signals from disrupting the proper operation of the tone detector 124. The tone detector 124 detects the 3 KHZ test tone from the central station 112. Whenever this tone is detected, a signal goes to the control logic 125. The control logic 125 receives signals from the tone detector 124, the fire alarm input 128, the emergency alarm input 129, the input monitor 127, and the status switch 130. It controls the operation of the two-tone generator 126 which puts out either a 1500 HZ or 750 HZ tone upon command of the control logic 125. The signal output from the tone generator 126 is amplified by the output amplifier 121 in the audio channel 114 and is then coupled to the telephone line 116 through the hybrid 115.

The fire alarm 126 includes a fire sensor of a type known in the art and means responsive to the fire sensor for generating a signal which causes the control logic to command the tone generator 126 to supply a 750 HZ tone to the output amplifier 121. The emergency alarm 129 includes a sensor for sensing various emergency conditions other than fire such as burglary, vandalism etc. and means responsive to the emergency sensor for generating a signal which causes the control logic 125 to command the tone generator 126 to supply a 1500 HZ tone to the output amplifier 121. In their preferred form the fire alarm sensor and emergency sensors will include means for grounding their respective input lines 128*a* and 129*a* to the control logic 125. The amplitude of the tones produced by the two-tone generator 126 is high enough that it is easily distinguishable at the central station 112, even in the presence of other audio signals.

The status switch 130 is operatively associated with means for supplying power from power supply 131 to the audio channel preamplifier 119. The power supply 131 preferably contains rechargable nickel-cadmium batteries, an automatic charging circuit, and circuitry that allows the system to operate without interruption through failure of power from the 110V AC line. The power supply 131 provides the necessary voltages for operating the various components of the system shown in FIG. 8 in a conventional manner. When the audio channel 114 is in its normal sound monitoring mode, the status switch 130 is in the "ON" position. An indicator on the status switch 130 reminds the customer at the remote station 112 of the operative status of the system. When the status switch is in its "OFF" position, a signal is supplied to the control logic 125 which commands the tone generator 126 to generate a 1500 HZ tone. The audio function of the audio monitoring channel 114 will be turned off but all other functions of the system at the remote station 111 will be operative.

An input monitor 127 connected between the input filter for the preamplifier 119 and the control logic is provided to cause the control logic to prevent the sending of any signals by the tone generator 126 to the central station 112. The microphones 113 provide a relatively low resistant path to ground for direct current, therefore, when the microphone input lead 113a to the input filter 118 are unbroken the voltage across the input filter will be low. However, if the microphone wires are cut, the input voltage will rise and an appropriate signal will go to the control logic 125 to cause the control logic to command the generator 126 to cease all tone output.

Once every 100 seconds a 3 KHZ test tone is transmitted from the central station 112 to each remote station 111. This tone enters the hybrid 115 and is directed to the tone filter 123 and tone detector 124. If the status switch 130 is in the "ON" position, the control logic 125 turns on a 750 HZ return tone. The equipment at the central site is able to recognize this as a test tone, not a fire alarm, because of the presence of the 3 KHZ test tone at the same time.

When the central station receives and recognizes the 750 HZ return tone it turns off the 3 KHZ test tone.

If the 750 HZ tone continues to be received at the central site, it is recognized as a fire alarm. If no return tone is received, the central site signals an equipment or line failure.

If the microphone input lines 113*a* have been cut, the control logic 125 will inhibit the transmission of the return tone.

If the status switch 130 is in the "OFF" position the test sequence is repeated except that a 1500 HZ return tone is generated. The central site recognizes either 750 HZ or 1500 HZ frequency as verification of correct system operation. The central site uses these two separate return tones to identify the status of each individual remote site.

Looking now at FIG. 9 the means for periodically transmitting test signals to the remote station from the central station 112 includes a scanner 134, line test logic 135, a test oscillator 136 and a test address logic 139 all connected in seriatim with the transmit port of the hybrid 117. The scanner 134 includes means for generating timing pulse signals for the automatic test functions of the system. By way of example, the scanner includes a clock which steps a counter that counts to 100 (the preferred maximum number of channels from remote stations in a single monitoring system). The counter is advanced at one step per second, thus every channel is tested once every 100 seconds. The counter is decoded and the count is displayed as two decimal digits on a front panel in the operator's view at the central station to indicate which station is being tested at a particular moment. The scanner 134 sends a test pulse according to the specific example once every second to the line check logic 135 and sends a coded signal indicative of a specific channel being addressed at any given instant to the test address logic 139, via conductor 137. The line check logic 135 corresponds with the test flip-flop 24 discussed previously in reference to FIGS. 2, 3, and 6. On receipt of a test pulse from the scanner 134, the line check logic turns on the test oscillator 136 which produces a tone burst signal in the audio frequency range, for example 3 KHZ. The 3 KHZ signal from the test oscillator 136 is rotated to a particular one of the remote stations being monitored by the central station 112. There is a test address logic 139 for each remote station included in the system which responds to a coded address signal from the scanner 134 to pass a tone burst signal from the test oscillator to the remote station under test through the transmit port of a hybrid 117. The hybrid 117, like the hybrid 115 in FIG. 8 is a conventional two transformer balance network which isolates transmitted and received signals carried to and from a remote station by telephone line 116.

The components within the channel module box 150, indicated by dotted lines in FIG. 9, are all associated with a single channel, that is, a single remote station. The components shown in FIG. 9 which are outside of the box 150 are common to multiple channels to remote stations and any number of channel modules within the designed capacity of the system may be connected in parallel at the points A through F shown in FIG. 9 in the same manner as the module 150 shown. Each channel module 150 includes in addition to the test logic 139 and hybrid 117, already discussed, a line amplifier 142 connected to receive input signals from the receive port of the hybrid 117. The output side of the line amplifier 142 is connected in parallel to a peak detector 143 and to three separate gated amplifiers 147, 148 and 149. The output side of the peak detector 143 is connected to input terminals of a tone comparator 144, a squelch comparator 145 and an alarm comparator 146. Sources of reference voltages 144*a*, 145*a* and 146*a* are connected to another set of input terminals of the comparators 144, 145 and 146. The test address logic 139, the hybrid 117, the line amplifier 142, the peak detector 143, the three comparators 144, 145, 146, the reference voltage sources 1442, 145*a*, 146*a* and the three gated amplifiers 147, 148 and 149 are all components of each channel module connected in the system at the central station.

The line amplifier 142 compensates for the losses in the telephone line 116. Its gain is adjustable. The output of the line amplifier goes to the three separate gated amplifiers 147, 148, 149 and to the peak detector 143. The peak detector 143 generates a DC level proportional to the amplitude of the peaks of the incoming signal. This is done accurately and stably with an operational amplifier. The attack time constant is adjusted to respond rapidly and yet have reasonable noise immunity. The DC level from the peak detector 143 goes to the three separate amplitude comparators 144, 145 and 146.

Each of the three amplitude comparators compares the DC level from the peak detector 143 with a reference level. When the peak detector 143 output exceeds that reference level, a logic output is generated. The alarm comparator 146 generates an alarm signal whenever a sound at the remote station 111 exceeds a preset threshold. The alarm signal from the comparator 146 triggers an alarm circuit 151. The alarm circuit generates an alarm tone which is fed to a power amplifier which drives a common monitor loudspeak 159. The alarm tone also is fed to a display and select circuit 151 which illuminates an indicator lamp. A control in the comparator circuit 146 allows the threshold of the comparator to be adjusted to suit the individual remote station to which it is connected. The squelch comparator 145 provides a control signal for a squelch circuit including a gated amplifier 148. The squelch circuit allows the common monitor 159 to be silenced, free of background noise when there is no disturbance at the remote station 111. The squelch may be disabled with a front panel switch (not shown). The third comparator 144 detects the high level tones that are used for line test, fire, and emergency alarms. It is set at a fixed level, much higher than the alarm or squelch.

The three gated amplifiers 147, 148 and 149, tied to the output of the line amplifier, have a gain of one when they are turned on and can be turned completely off with a control signal.

As previously stated, one or more channel modules 150 at the central station 112 are connected in parallel at points A through F in the circuit shown in FIG. 9. Point A connects the output of gated amplifier 149 in each channel module to a tone detector circuit 154 which detects the on-off status signal from the one or more remote stations 111. The output of the status tone detector circuit 154 is connected to a status display 160, and to the line check logic reset terminal 135a for resetting the line check logic 135 and turning off the test oscillator 136.

Point B connects the output of gated amplifier 148 in each channel module to an automatic gain control (AGC) 153 which is connected in series with a power amplifier 158 and the common monitor loudspeaker 159 to form a common monitor channel. The AGC 153 increases the amplifier gain for faint sounds and automatically reduces the amplifier gain for loud sounds, thus minimizing the need for operator gain adjustment. Provision will normally be provided to turn off the AGC 153 from a front panel switch (not shown) within the view of an operator, and for manual adjustment of the gain by a manual gain control.

Point C connects the output of the gated amplifier 147 in each channel module to an automatic gain control (AGC) 152 which is connected in series circuit with a power amplifier 156 and a select monitor loudspeaker 157 to form a select monitor channel. The AGC 152 will perform the same functions as the AGC 153 and will be provided with an on-off switch and a manual gain control (not shown). The output of the AGC 152 is applied to a tone detector 161 used to identify fire and emergency alarm tones. The detector 161 has two phase-lock loops — one tuned to 750 HZ and the other to 1500 HZ. The 750 HZ loop is connected to the fire indicator 162, while the 1500 HZ loop is connected to the emergency indicator 163. If a 750 HZ frequency signal is present in the select monitor channel, the fire indicator 162 is turned on and if a 1500 HZ frequency signal is present in the select monitor channel, the emergency indicator 163 is turned on.

Point D connects the output of the alarm comparator 146 in each channel module to an alarm circuit 151 whose output is connected to both a display and select circuit 155 and to the power amplifier 158 in the common monitor channel. When the alarm comparator 146 in any of the channel modules connected at point D receives a tone from a remote station above the threshold level for which the comparator is set, the alarm circuit 151 will be actuated to produce an alarm signal. The alarm signal will be amplified by the power amplifier 158 in the common monitor channel and will be transduced into an audible alarm sound by the common monitor loudspeaker 159. The alarm signal also will energize a light in the display and select circuit 155 indicating an alarm condition at one of the remote stations 111. Thus appraised of an existing alarm condition, an operator will be able to select a particular remote channel for monitoring through the select monitor 157 by actuating a selected one of a group of channel select switches located on a front panel (not shown) and included in the display and select circuitry 155. Each channel select switch controls a gated amplifier 147 in a selected channel module. Connections 1, 2, 3, 4, 5 — *n* from the separate select switches to the separate channel modules for the multiple remote stations are indicated at the top of the display and select box 155. Only one connection 164-4 is shown completed to avoid cluttering the drawing. When a select switch is closed, the gated amplifier 147 in the selected channel module will be turned on to pass audio frequency signals received from the remote station associated with the selected channel module through the select monitor channel where the signals are amplified and transduced into sound by loudspeaker 157. Each channel select switch not only functions to route a particular channel to the select monitor 157 by controlling the gated amplifier 147 of the particular channel module selected, but removes that channel from the common monitor 159 by gating the gated amplifier 148 closed through conductor 165.

Point E connects the output of test oscillator 136 to the signal input terminal of the test address logic 139, and point F connects the address code output of the scanner 134 to the address terminal of the test address logic in each of the channel modules connected in the system.

The operation of the alarm system shown in FIGS. 8 and 9 will now be further described. It will be understood that one or more operators will be present at the central station 112 to monitor the multiple remote stations 111 whose premises are protected and to take appropriate action in the event of abnormal conditions occurring at any of the remote stations. Normally the operator will have before him at the central station a fault display panel 141 on which is mounted an electric light indicator of a fault condition in the lines connecting the central and remote stations, a status display for indicating the on or off status of a remote station, a display and select panel 155 for indicating an alarm condition at a remote station and for enabling the operator to select a particular remote station for monitoring through the select monitor 157, a fire indicator 162 and an emergency indicator 163 for indicating the type of alarm condition present. The loudspeakers 159 and 157 enable the operator to monitor all of the remote stations at one time through the common monitor 159, and to monitor a selected one of the remote stations through the select monitor 157. Prior to the occurrance of an alarm condition at a remote station, the operator will normally listen through the common monitor 159 to all the remote stations. Sounds picked up by microphones 113 at any of the protected stations which are activated (i.e. which are energized and in an on status) will be converted to electric audio signals. The audio signals will be filtered to remove system hum and noise and amplified in the audio channel 114 of the remote station, couupled through the hybrid 115 into the line 116, coupled from the line 116 at the central station into the line amplifier 142 which raises the signal level at the central station to compensate for line drop in transmission from the remote station to the central station. The output of the line amplifier 142 is applied to the three gated amplifiers 147, 148 and 149 and to the peak detector 143. The common monitor loudspeaker 159 monitors all of the remote stations for sound through the gated amplifier 148 in each channel module 150. The gated amplifiers 148 of each module are controlled by the squelch comparator 145 in the respective channel modules. In this manner the output of the common monitor loudspeaker remains silent or squelched until the threshold level of one channel is exceeded. It is important to note that the squelch is applied to the gated amplifier 148 separately in each channel module. In this manner the combined background noise of many channels cannot exceed the squelch threshold.

When the operator hears a sound produced by the common monitor 159 which warrants closer investigation, the operator will locate the remote station from which the sound originates by means of the display and select circuitry 155.

When the alarm comparator 146 threshold is exceeded, a panel indicator in the display and select circuitry 155 is turned on. This indicator tells the operator from which remote site a sound originated. The operator then makes a decision as to the origin of this sound. To do so, he must isolate this one channel from the rest and listen to it more carefully. A group of switches on the front panel allows the operator to select any one or more channels for individual monitoring. Each channel select switch controls a gated amplifier 147 that goes to the select monitor power amplifier 156 and speaker 157. Each channel select switch not only routes that particular channel to the select monitor 157 but removes it from the common monitor 159 by gating the gated amplifier 148 closed. This aids in confirming the source of the sound.

If a fire or an emergency condition such as a burglary occurs at a remote station, the fire alarm 128, or the emergency alarm 129 at the remote station (see FIG. 8) is activated and the control logic 125 is signaled by these alarms. If the fire alarm 128 is activated, the control logic 125 will cause the two-tone generator 126 to produce a 750 HZ output; if the emergency alarm 129 is activated the control logic 125 will cause the two-tone generator 126 to produce a 1500 HZ output. The 750 HZ or the 1500 HZ signal from the tone generator 126 will be amplified by output amplifier 121 and transmitted over line 116 to the central station 112 (see FIG. 9) where it is taken from the line 116 by hybrid 117 and amplified by line amplifier 142. The 750 HZ fire or 1500 HZ emergency signal whichever is present will be heard by the operator through the common monitor 159. The operator will then isolate the remote station at which the alarm signal originates by means of select switches in the display and select circuitry 155 so that the alarm signal is heard over the select monitor 157. Once isolated by a select switch, the alarm signal is not heard over the common monitor, unless more than one remote station has a fire or emergency condition, in which case an alarm signal will continue to be heard over the common monitor until all remote stations are isolated by select switches in the display and select circuitry. The isolated alarm signal will be identified by the two-tone detector 161 tied to the select monitor channel on the output side of the AGC 152. If the 750 HZ signal is present the "Fire" indicator 162 is turned on. If the 1500 HZ signal is present the emergency indicator 163 is turned on.

While the operator is monitoring sounds originating at one or more of the remote stations the line integrity and operating status of the remote stations are being automatically tested. Periodic pulses generated by the scanner 134 control the line check logic 135 to turn on the test oscillator 136. Coded signals representing the different remote stations are sequentially produced by the scanner 134 and are applied through line 137 to the test address logic of the multiple channel modules 150 at the central station 112. The test address logic 139 of the channel modules will respond in sequence to pass the 3 KHZ test frequency signal generated by oscillator 136 through the properly addressed channel module and its associated telephone line 116 to the corresponding remote station. At the remote station the 3 KHZ test frequency signal will be taken from the hybrid 115 by line 122, passed through the tone filter 123 and detected by the test tone detector 124. The test tone detector 124 produces an output signal in response to the test frequency signal which actuates the control logic 125 to cause the tone generator 126 to respond with either a 750 HZ or 1500 HZ return tone depending on whether the remote station is turned on or off. The return tone is amplified by output amplifier 121, and transmitted to the channel module 150 at the central station which is under test via hybrid 115 and telephone line 116. The return tone is taken from the telephone line via hybrid 117, amplified by line amplifier 142, and detected by the peak detector 143. The DC level signal from the peak detector 143 triggers the tone comparator 144 which turns on the gated amplifier 149. The gated amplifier 149 then passes the 750 HZ or 1500 HZ return tone to the two-tone detector 154 which identifies the tone as either a 750 HZ or 1500 HZ tone and sets the status display register 160. There is a latch (flip-flop comparable to the status flip-flop 51 shown in FIG. 6) in the status display register 160 for every channel. As each channel is tested, its status is retained in the display register 160. An indicator is on each latch, thus the operator knows the status of each remote station at all times. If a fault exists in the remote station channel under test, no return tone will be received at the central station. If after a predetermined time, for example one second, a return tone is still not received, a fault display 140 is energized. The line check logic 135 stores the scanner address which is displayed in decimal form on a front panel within view of the operator. This number will remain in storage until it is manually cleared with a front panel button.

Additional logic functions are included which prevent the automatic line checking function from interfering with the status display. During the automatic check cycle, the audio output from the channel under test is gated off by the gated amplifier 147 so that it is inaudible.

An internal switch (not shown) is provided on each channel so that it may be disabled and will not give an alarm. This allows an unused channel, a channel under repair, or a defective channel fron interfering with the operation of the system. A front panel switch will be provided which turns off the automatic checking functions without disturbing the audio monitoring or alarm functions. This allows for continuing remote station protection even during most types of central station repairs.

While the communication means for the transfer of electrical signals between remote and central stations has been shown in the drawings as a telephone line, it is to be understood that other communication means including but not limited to T.V. cables, microwave, etc. may be used for the transfer of electrical signals in accordance with this invention. It will be further understood that when a telephone system is utilized, it may include transformers, amplifiers, repeaters, microwave relays, or carrier equipment in accordance with the techniques of modern telephone communications.

While in the foregoing there have been described and shown preferred embodiments of the invention, various modifications and equivalents may be resorted to within the spirit and scope of the invention as claimed.

What is claimed is:

1. In a monitoring system for monitoring from a central station at least one condition occurring in at least one remote station, said system having communication means for transfer of electrical signals between said central and remote stations, coupling means at said central and remote stations for coupling electrical signals between said communication means and said central and remote stations respectively, said coupling means having transmit and receive ports, an improved system for testing the integrity of said monitoring system comprising means at the central station for generating periodic test pulses, test oscillator means for generating a first frequency test signal, oscillator control means for turning said oscillator means on and off so that the oscillator means will oscillate while on and cease to oscillate while off, said oscillator control means being responsive to pulses from said test pulse generating means to turn said oscillator means on, means for conducting said first frequency test signal to the transmit port of said coupling means at said central station whereby said test signal is coupled to said communication means and conveyed to the receive port of said remote station, means at said remote station responsive to said test signal to produce a second frequency signal different from said test signal, circuit means for conducting said second frequency signal to the transmit port of said coupling means at said remote station whereby said second frequency signal is coupled to said communication means and conveyed to the receive port of said central station, a first detector means responsive to said second frequency signal for producing a verify signal when said second frequency signal is detected, said control means being responsive to said verify signal for turning said oscillator means off, an alarm for alerting an operator whenever a verify signal fails to be produced within a predetermined time period after each test pulse, said alarm having means for actuating said alarm in response to a test pulse signal after a time delay equal to said predetermined time period and means responsive to said verify signal for blocking the actuation of said alarm when the verify signal is received within said predetermined time period, said predetermined time period being equal to at least the propagation delay time within the testing system which is measured from the time each test pulse is generated until a second frequency signal can normally be detected by said detector means.

2. The system according to claim 1 wherein said monitoring system has audio monitoring means at said remote station which includes microphone transducer means for converting sounds within said remote station into audio electric signals, means for amplifying said audio electric signal and means for conducting said audio electric signals to said transmit port of said coupling means at said remote station whereby said audio electric signals are conveyed to the receive port of said coupling means at said central station, and audio transducing means at the central station for transducing said audio electric signals into sound.

3. The system according to claim 2 together with alarm means responsive to said audio electric signals above a preset threshold for alerting an operator.

4. The system according to claim 2 together with blocking means for blocking audio electric signals from said audio transducing means while said first frequency test signal is being produced and while said second frequency response signal is being detected by said first detector means.

5. The system according to claim 4 wherein said blocking means includes a normally open control gate in circuit between said central station receive port and said audio transducing means, and an OR gate for closing said control gate, said OR gate having a pair of input terminals connected to said first detector means and said oscillator control means respectively, said OR gate being responsive to signals from either said oscillator control means or said first detector means to close said control gate and thereby block audio signals from said audio transducing means.

6. The system according to claim 2 wherein said monitoring system includes a power supply means for energizing said audio monitoring means at said remote station and a power switch for turning said power supply on and off, a two position status switch operatively coordinated with said power switch to indicate the on or off status of said power switch when in the one or the other of said two positions, means for producing a third frequency signal different from said first and second frequency signals, said status switch when in said one position connecting the second frequency signal producing means to said transmit port of said coupling means at said remote station and when in said other position connecting the third frequency signal producing means to said latter couling means, a second detector means at said central station for detecting said third frequency signal and producing an off status signal, and status indicator means alternatively responsive to said verify signal from said first detector means and to said off status signal from said second detector to indicate the on and off status of said power switch.

7. The system according to claim 6 together with a pair of normally closed detector output gates connected respectively between said first and second detectors on their one side and said status indicator means on their other side, said detector gates each having means responsive to said oscillator control means for opening said detector gates while said oscillator control means operates to turn said oscillator means on.

8. The system according to claim 7 together with an OR gate responsive to either of said verify signal or said off status signal for producing an output reset signal for resetting said oscillator control means and thereby turning off said oscillator means until another first frequency signal test pulse is received.

9. The system according to claim 2 wherein said microphone transducer means has a relatively low electrical resistance path for direct current between a pair of output terminals, a conductor lead connecting one of said output terminals to said amplifier means, a source of direct current and a resistor having a resistance which is high relative to said microphone resistance path connected between said other terminal and a point on said lead near the amplifier means, means responsive to the cutting of said conductor lead anywhere between said microphone and said point for blocking the response of said second frequency signal producing means to said first frequency test signal including a normally open gate connected in series circuit between said remote station receive port and said second frequency signal producing means, said gate having a control input terminal and circuit means connecting said control input terminal to said flexible conductor adjacent said point, said circuit means being responsive to a change in d.c. voltage at said point when said microphone conductor lead is cut to close said gate and prevent the response of said second frequency signal producing means to said test signal.

10. The system according to claim 9 wherein said circuit means includes at least one asymmetrical device for preventing current flow in the direction from said gate control input terminal to said point on said conductor lead while permitting current flow in the opposite direction.

11. The monitoring system according to claim 2 wherein said means at said remote station responsive to said test signal to produce a second frequency signal different from said test signal includes a two-tone generator means which is operable in response to control signals to produce alternatively two-tones which differ from each other and from said first signal frequency, a control logic means for producing control signals which actuate said tone generator to produce one or the other of said two tones, a test tone detector for detecting said first frequency test signal and producing an output signal for triggering said control logic to actuate said two-tone generator means to generate either one of two tones depending on the position of a status switch, a two position status switch for indicating the on or off status of said monitoring system at said remote station, said status switch in the off position producing a signal which triggers said control logic to respond to said tone detector output signal to cause said two-tone generator to produce the one of said two tones indicative of the off position of said status switch, the status switch in the on position producing a signal which triggers said control logic to respond to said tone detector output to cause said two tone generator to produce the other of said two tones which is indicative of the on position of said status switch.

12. The apparatus according to claim 11 wherein said first tone detector means is a two-tone detector which operates to distinguish between the one and the other of the two tones produced by said two-tone generator and produce alternatively one of two status output signals, depending on which of said two tones is detected, and a status indicator means at said central station responsive alternatively to the two status output signals to indicate the on or off status of said monitoring system at the remote station, each of said two status output signals corresponding to said verify signal, and said control means being responsive to the status output signals for turning said oscillator means off.

13. The system according to claim 12 together with means for sensing a fire and producing a control signal indicative of said fire, means for sensing an emergency condition other than said fire and producing a control signal indicative of said emergency condition, said control logic being responsive to said fire control signal to trigger said two-tone generator to produce one of said two tones and being responsive to said emergency control signal to trigger said two-tone generator to produce the other of said two tones, a fire indicator means at said central station, an emergency indicator means at said central station and an alarm tone detector means at said central station for distinguishing between the two tones produced by said two-tone generator and producing in response to the one tone a fire alarm signal, and in response to the other tone an emergency signal, said fire indicator means being responsive to said fire alarm signal for indicating a fire, and said emergency indicator being responsive to said emergency signal for indicating an emergency.

* * * * *